10

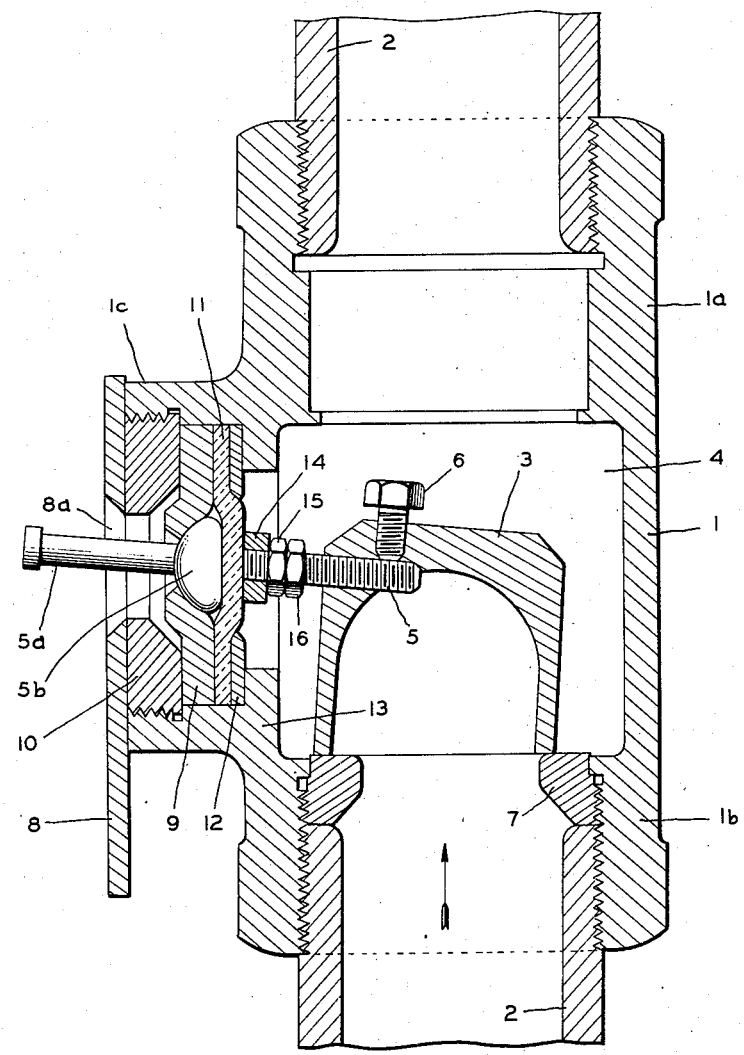

United States Patent Office 2,702,519
Patented Feb. 22, 1955

2,702,519

LIQUID CIRCULATION INDICATOR

Jean de Poutiloff, Paris, France, assignor to Societe "Le Materiel Electrique S. W.," Paris, France, a French corporation Application August 24, 1951, Serial No. 243,567

Claims priority, application France September 6, 1950

1 Claim. (Cl. 116—117)

This invention relates to improved means for indicating the circulation of fluid through a pipe or conduit.

It has been proposed heretofore to provide an external indication of the circulation of fluid in a pipe or conduit by means of a member sensitive to and movable by fluid impulsion and disposed within the conduit, said member being mounted on an articulated rod projecting through an opening in the conduit wall which is closed by a fluid-tight membrane. The circulation of fluid in the conduit then causes movement of said member which is indicated externally by corresponding movement of the outer end of said rod which, if desired, may also actuate a suitable warning or indicating device.

The principal object of the present invention is to provide an improved mechanism of the class described above which is sufficiently strong and rugged to withstand high pressures and long usage but yet is designed and constructed so as to be sensitive even to very slight circulation.

To these ends the articulation of the rod is provided by means of a joint of the ball and socket or equivalent type comprising cooperating parts one attached to or formed on the rod itself and the other attached to or formed in the wall of the conduit, and the rod extends through and is sealed to the central portion of a flexible membrane or diaphragm which is inserted in the conduit wall and closes the opening therein through which said rod projects to the outside of the conduit.

In a preferred embodiment, the member sensitive to liquid impulsion is constituted by an inverted cup or bowl suitably mounted on the inner end of the articulated rod and arranged so that in its inactive position (zero circulation), the rim of the cup engages a seat attached to or formed in the conduit and profiled so as to serve as a guide for the liquid vein. This engagement can take place as the result of the weight of the sensitive member, or the latter can be urged in the appropriate direction by any suitable means such as a spring.

Apparatus embodying the foregoing features of the invention presents the following advantages with respect to prior mechanisms of the type in question:

The fluid-tight membrane or diaphragm, engaging a support at or near its center, can bear high pressures of the circulating liquid without fatigue and without loss of sensitivity of the apparatus.

In the preferred embodiment mentioned above, the engagement of the sensitive member with its seat in the absence of any circulation serves to obturate the fluid passage. Preferably, moreover, the movement of the sensitive member to its obturating position causes a correlative deformation of the diaphragm which tends to return the sensitive member to non-obturating position. The result is that the apparatus possesses great sensitivity which permits it to detect the least delivery of fluid which may occur in the conduit, which is not the case with known mechanisms provided with a simple impulse blade immersed in the fluid.

The single figure of the accompanying drawing represents, by way of example, a sectional elevational of one embodiment of the invention, the mechanism being shown in its position of rest.

In the drawing, 1 designates any suitable casing designed to contain and support circulation indicating apparatus comprising the invention. As shown, said casing is provided with three tubular openings 1a, 1b and 1c, the openings 1a and 1b being connected in a conduit 2 through which the circulation to be indicated takes place.

The indicating apparatus comprises a member 3 receiving the impulsion of the liquid, which member in the form shown in the drawing comprises a sort of inverted cylindrical bowl or cup the external diameter of which is suitably chosen with regard to the diameter of the chamber 4 of the casing 1 so that fluid flow in the direction of the arrow is not impeded during its passage between the bowl and the casing, while maintaining on the bowl a pressure sufficient to avoid any pumping effect.

The bowl or cup 3 is mounted in any suitable manner on the inner end of a rod 5, preferably having threaded engagement therewith for adjustability and being fixed in the proper position thereon by a set screw 6. In repose, that is to say in the absence of any circulation of liquid, the rim of the cup 3 engages a seat 7 threaded in the tubular opening 1a and profiled in a manner to serve as a guide for the liquid vein discharging into the chamber 4. In this position, the member 3 obturates the fluid passage.

The supporting rod 5 passes outwardly through the lateral opening 1c in the casing wall and is mounted for oscillation in a plane containing its axis and that of the casing around a suitably chosen point, its outer end 5a being preferably guided in a slideway 8a formed in a plate 8.

In the preferred embodiment of the principal features of the invention as set forth above, the articulation of the rod 5 and its connection to the fluid-tight membrane or diaphragm are accomplished as follows:

On the rod 5 is formed an enlargement in the form of a hemispherical head 5b which bears against a socket of the same shape formed in a washer 9 of antifriction metal, the rod 5 passing through the central opening of the washer. An externally threaded ring nut 10 is screwed into the tubular opening 1c and surrounds the rod 5, said nut tightening the margin of the washer against the margin of a disk 11 of flexible or elastic material, the margin of said disk bearing on a washer 12 supported on a shoulder 13 in the tubular opening 1c of the casing. The rod 5 projects centrally through the disk 11 which is locked against the plane face of the head 5b by suitable means such as a washer 14 and a nut 15 and lock nut 16 threaded on the rod. The center of the spherical head or ball 5b is further chosen in a manner so that it is located substantially at the center of the disk 11.

It will be noted among other things that, in the position of rest of the apparatus described above, the rod 5 is slightly inclined with respect to the axis of the opening 1c, causing a certain deformation of the disk 11 as mentioned above, and the cylindrical bowl 3 likewise occupies a position inclined with respect to the axis of the conduit. The result is that when normal liquid flow takes place in the conduit 2, the position of the cylindrical bowl with relation to the conduit is such that the liquid vein flows freely while pressure on the bowl sufficient to avoid pumping is assured.

Of course, the invention is not limited to the embodiment specifically described above and shown in the drawing. Its chief characteristics, which can be utilized separately, have been set forth broadly in the preceding description and are defined in the following claims.

What is claimed is:

Means for indicating the circulation of fluid in a conduit comprising an indicating rod projecting through an opening in the wall of said conduit, means for articulating said rod comprising an enlargement on said rod having a substantially spherical outer surface and a substantially flat inner surface extending radially with respect to the rod, socket means on said conduit engaged by said substantially spherical surface, a flexible diaphragm extending across and closing said opening and having a substantially central aperture through which said rod extends into said conduit, means securing said diaphragm against said flat inner surface of said enlargement and sealing said aperture, the meeting surfaces of said socket and enlargement being relatively movable on flexure of said diaphragm to provide with the diaphragm an articulated mounting for said rod, and a member sensitive to fluid impulsion disposed within said conduit and mounted on said rod, the fluid pressure on said diaphragm urging said enlargement into said socket.

References Cited in the file of this patent

UNITED STATES PATENTS

| | | |
|---|---|---|
| 863,553 | Nolen | Aug. 13, 1907 |
| 1,716,377 | Grant | June 11, 1929 |
| 2,278,263 | Hoelscher | Mar. 31, 1942 |

FOREIGN PATENTS

| | | |
|---|---|---|
| 770,942 | France | Sept. 24, 1934 |